(12) United States Patent
Smit (10) Patent No.: US 7,277,504 B2
(45) Date of Patent: Oct. 2, 2007

(54) METHOD AND SYSTEM FOR CONCURRENT ESTIMATION OF FREQUENCY OFFSET AND MODULATION INDEX

(75) Inventor: Gerrit Smit, Hertme (NL)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 918 days.

(21) Appl. No.: 10/603,469

(22) Filed: Jun. 25, 2003

(65) Prior Publication Data

US 2004/0136480 A1 Jul. 15, 2004

Related U.S. Application Data

(60) Provisional application No. 60/392,114, filed on Jun. 27, 2002.

(51) Int. Cl.
*H04L 27/22* (2006.01)
(52) U.S. Cl. .............. 375/329; 375/324; 375/331; 375/332
(58) Field of Classification Search ............ 375/316, 375/322, 324, 330, 242, 259, 279, 280, 281, 375/284, 340, 377; 455/44, 23, 205; 332/112, 332/144; 329/345; 370/215
See application file for complete search history.

(56) References Cited

U.S. PATENT DOCUMENTS

| 5,062,123 | A | 10/1991 | Geile et al. |
|---|---|---|---|
| 5,151,925 | A | 9/1992 | Gelin et al. |
| 5,255,290 | A | 10/1993 | Anvari |
| 5,434,889 | A | 7/1995 | Baier |
| 5,802,117 | A | 9/1998 | Ghosh |
| 6,130,921 | A * | 10/2000 | Powell et al. ............... 375/344 |
| 6,347,126 | B1 | 2/2002 | Nagayasu et al. |
| 6,363,131 | B1 | 3/2002 | Beidas et al. |
| 6,389,040 | B1 | 5/2002 | Viswanathan |
| 6,393,068 | B1 | 5/2002 | Rupp |
| 6,393,073 | B1 | 5/2002 | Eilts |
| 6,476,684 | B2 * | 11/2002 | Park ........................... 332/127 |
| 2001/0031022 | A1 | 10/2001 | Petrus et al. |
| 2002/0094048 | A1 | 7/2002 | Simmons et al. |

FOREIGN PATENT DOCUMENTS

| EP | 0 671837 | 9/1995 |
|---|---|---|
| WO | WO 02/37744 A1 | 5/2002 |
| WO | WO 02/39688 A1 | 5/2002 |
| WO | WO 2004/004268 | 1/2004 |

OTHER PUBLICATIONS

Data-Aided Noncoherent Demodulation of DPSK; by Harry Leib; IEEE Transactions on Communications, vol. 43, No. 2/3/4; Feb./Mar./Apr. 1995; pp. 722-724.

(Continued)

*Primary Examiner*—Chieh M. Fan
*Assistant Examiner*—Jaison Joseph
(74) *Attorney, Agent, or Firm*—Michael Cameron (57) ABSTRACT

A system for estimating the modulation index and frequency offset of a CPM signal. An estimator filters the received signal and utilizes a training sequence to determine the modulation index and frequency offset of the CPM signal. The estimator can also include a post-processing step to eliminate all or part of a bias that might be created by the estimator.

30 Claims, 3 Drawing Sheets

OTHER PUBLICATIONS

Digital Phase Modulation; by John B. Anderson et al.; Signal Analysis and an Overview of Modulation Methods; 3 Pages.

Differential Detection with IIR Filer for Improving DPSK Detection Performance by Naokazu Hamamoto; IEEE Transactions on Communications, vol. 44, No. 8 (Aug. 1996); pp. 959-965.

Fonollosa, J.R. et al., "Analysis of CPM Signals using Higher-Order Statistics", Military Communications Conference, 1993. Milcom 1993. Conference Record. Communications on the Move, IEEE Boston, MA, Oct. 11-14, 1993, New, NY, IEEE. (pp. 663-667).

Fonollosa, J.R. et al., "Estimation of the Modulation Index of CPM Signals Using Higher-Order Statistics", Statistical Signal and Array Processing, Minneapolis, Apr. 27-30, 1993, Proceedings of the International Conference on Acoustics, Speech, and Signal Processing, New York, IEEE, US, vol. 4, Apr. 27, 1993, (pp. 268-271).

Motorola's Bluetooth Solution to Interface Rejection and Coexistence with 802.11 by Weizhong Chen, Ph.D.; Copyright Motorola, Inc., 2001; 14 Pages.

Fractionally-Spaced Differential Detection of GFSK Signals with Small h* by Sukkyun Hong and Yong-Hwan Lee; IEICE Trans. Commun., vol. E-84-B, No. 12; Dec. 2001; 9 Pages.

Non Data Aided Estimation of the Modulation Index of Continuous Phase Modulations by Pascal Bianchi, Philippe Loubaton and Francois Sirven; Jan. 28, 2003; 30 Pages.

Reilly, D., International Search Report prepared by European Patent Office on Oct. 6, 2003 (4 pages).

B. K. Poh et al; "A High Data Rate MDPSK Receiver Architecture for Indoor Wireless Application"; IEEE, vol. 4, Sep. 15, 2004, pp. 1718-1721.

* cited by examiner

METHOD AND SYSTEM FOR CONCURRENT ESTIMATION OF FREQUENCY OFFSET AND MODULATION INDEX

CROSS-REFERENCE TO RELATED APPLICATIONS

This patent application claims the benefit of priority from and incorporates by reference the entire disclosure of U.S. Provisional Patent Application No. 60/392,114, filed on Jun. 27, 2002.

BACKGROUND OF THE INVENTION

1. Technical Field of the Invention

The present invention relates generally to the field of radio receivers that utilize continuous phase modulation (CPM) and, more particularly, to a method of and system for estimating a modulation index and a carrier frequency offset of a CPM signal.

2. Description of Related Art

Wireless technologies, such as terrestrial and satellite mobile communications and/or BLUETOOTH systems, may use continuous-phase-modulated (CPM) signals to transmit data. Binary CPM or M-ary CPM may be employed for the wireless transmission of data packets. When data is transmitted using CPM, the modulation index may need to be known in some receiver architectures.

To improve performance, receiver architectures could be employed that require knowledge of the value of the modulation index of the transmitted signal. Due to the use of independent frequency generating circuits in the transmitting and receiving devices, a carrier frequency offset is typically generated. In order to achieve optimal performance, the carrier frequency offset should be compensated for as much as possible. Therefore, there is a need for a method of and system for estimating the modulation index and the carrier frequency offset of a CPM signal.

SUMMARY OF THE INVENTION

These and other drawbacks are overcome by embodiments of the present invention, which provide a method of and system for concurrent estimation of a modulation index and frequency offset of a CPM signal. An estimator for estimating a modulation index and frequency offset of a received continuous-phase-modulated (CPM) signal includes at least two filters for filtering the received CPM signal, a calculator for calculating an $\alpha$ value and a $\beta$ value, and a processor for receiving a signal output by each of the at least two filters, the $\alpha$ value, and the $\beta$ value. The processor is adapted to calculate estimates of the modulation index and frequency offset from the signals received by the processor and the received $\alpha$ value and $\beta$ value.

A method of estimating a modulation index and frequency offset of a received continuous-phase-modulated (CPM) signal includes filtering the received CPM signal via at least two filters, calculating an $\alpha$ value and a $\beta$ value, receiving a signal output by each of the at least two filters, the $\alpha$ value, and the $\beta$ value, and calculating estimates of the modulation index and frequency offset from the received signals and the received $\alpha$ value and $\beta$ value.

An estimator for estimating a modulation index and frequency offset of a received continuous-phase-modulated (CPM) signal includes a noise whitener for whitening noise of the received CPM signal, at least two filters for filtering the noise-whitened CPM signal, an initializer for processing a training sequence, and a processor for receiving a signal output by each of the at least two filters and the processed training sequence. The processor is adapted to calculate estimates of the modulation index and frequency offset from the signals received by the processor and the processed training sequence.

A method of estimating a modulation index and frequency offset of a received continuous-phase-modulated (CPM) signal includes whitening noise of the received CPM signal, filtering the noise-whitened CPM signal via at least two filters, processing a training sequence, receiving a signal output by each of the at least two filters and the processed training sequence, and calculating estimates of the modulation index and frequency offset from the received signals and the processed training sequence.

An estimator for estimating a modulation index and frequency offset of a received continuous-phase-modulated (CPM) signal includes at least two filters for filtering the received CPM signal, a noise whitener for whitening noise of a signal output by the at least two filters, an initializer for processing a training sequence, a processor for receiving signals output by the noise whitener and the processed training sequence. The processor is adapted to calculate an estimate of the modulation index and the frequency offset from the received signals and the processed training sequence.

An estimator for estimating a modulation index and frequency offset of a received continuous-phase-modulated (CPM) signal includes a receiver for receiving the CPM signal and a processor for estimating the modulation index and frequency offset according to the following equation $v=(B^T C^{-1} B)^{-1} B^T C^{-1} \phi$. $v$ represents a vector including elements representing scaled versions of estimates of the modulation index and the frequency offset. C represents a noise covariance matrix, B represents a data model matrix, and $\phi$ is an observation vector that represents a phase of the CPM signal.

Further advantages and specific details of the present invention will become apparent hereinafter from the detailed description given below in conjunction with the following drawings.

BRIEF DESCRIPTION OF THE DRAWINGS

A more complete understanding of exemplary embodiments of the present invention can be achieved by reference to the following Detailed Description of Exemplary Embodiments of the Invention when taken in conjunction with the accompanying Drawings, wherein.

DETAILED DESCRIPTION OF EXEMPLARY EMBODIMENTS OF THE INVENTION

In accordance with principles of the present invention, several approaches can be taken to estimate the modulation index and carrier frequency offset of a CPM signal. The estimators associated with aspects of the present invention may be divided into two distinct categories, namely estimators that assume white noise and estimators that assume colored noise. Another classification within the two distinct categories may be made based upon whether or not Inter-Symbol Interference (ISI) is assumed to be present in the input signal. When it is assumed that ISI is present, two further subclasses may be introduced based on whether or not the value of a parameter $\epsilon$ is known or unknown. The estimators described hereinafter are based upon the least-squares approach and can be represented by the following equation:

$$v = (B^T C^{-1} B)^{-1} B^T C^{-1} \phi \qquad (1)$$

In equation (1) above, $v$ is a vector that includes elements representing scaled versions of the estimates of the modulation index and the frequency offset. The matrix C represents a noise covariance matrix and the matrix B represents the data model. The last three terms in equation (1) are a filter operation on an observation vector $\phi$ which is the phase input to the estimator.

Figure 1:
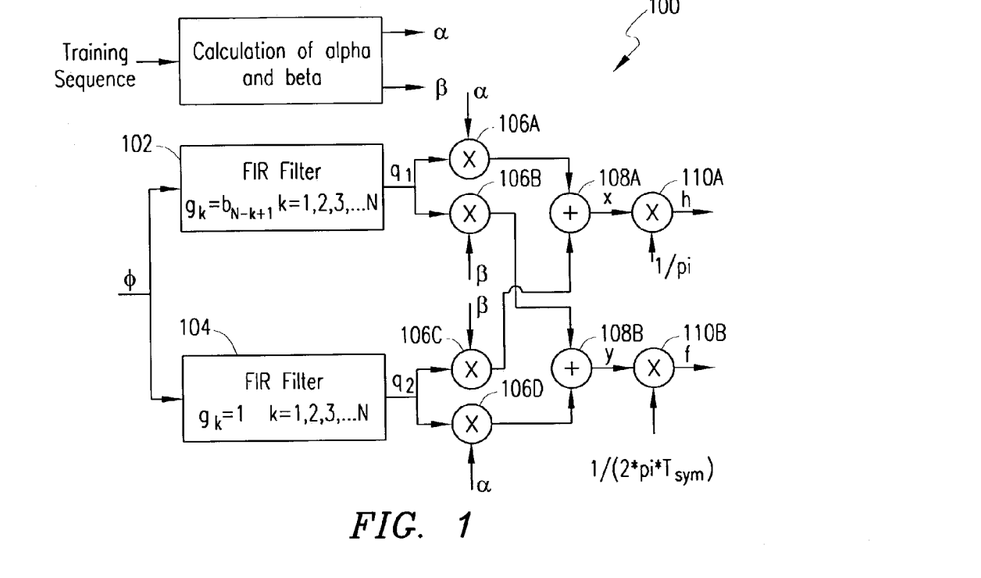
FIG. 1 is a block diagram that schematically illustrates an estimator in accordance with principles of the present invention.

A first approach uses an estimator based upon a simple data model, which does not take into account the Inter-Symbol Interference (ISI). The first approach, as shown in detail in FIG. 1, assumes white noise and no ISI. By assuming that bit timing and frame synchronization are known, an output (i.e., an element of the observation vector) $\phi_k$ of a 1-bit differential demodulator at an optimal sampling moment can be modeled as:

$$\phi_k = b_k h\pi + 2\pi f T_{sym} + n_k$$

$$\phi_k = b_k x + y + n_k \qquad (2)$$

where $b_k$ is a transmitted bit, h is a modulation index, f is an actual frequency offset, $T_{sym}$ is a symbol period, and $n_k$ is a distortion term that includes noise and ISI. By omitting the noise terms $n_k$, equation (2) can be rewritten in matrix notation as follows:

$$\phi = Bv \text{ in which } \phi = \begin{bmatrix} \phi_1 \\ \phi_2 \\ \phi_3 \\ \vdots \\ \phi_N \end{bmatrix}, v = \begin{bmatrix} x \\ y \end{bmatrix} \text{ and } B = \begin{bmatrix} b_1 & 1 \\ b_2 & 1 \\ b_3 & 1 \\ \vdots & 1 \\ b_N & 1 \end{bmatrix} \qquad (3)$$

If $\{b_i\}_{i=1}^N$ (i.e.; N transmitted bits) are known, equation (3) can be solved by multiplying the observation vector $\phi$ by the pseudo-inverse of B. Assuming white noise is present, the covariance matrix C is equal to the identity matrix. Therefore, equation (1) may be rewritten as:

$$v = (B^T B)^{-1} B^T \phi \qquad (4)$$

wherein the superscript T denotes the transpose of the matrix B and the superscript −1 denotes the inverse of the resulting matrix shown in parentheses.

Given the above structure of the data matrix B, the following equations prove true:

$$B^T B = \begin{bmatrix} N & S \\ S & N \end{bmatrix} \text{ and } (B^T B)^{-1} = \begin{bmatrix} \alpha & \beta \\ \beta & \alpha \end{bmatrix} \text{ with} \qquad (5)$$

$$S = \sum_{k=1}^N b_k, \alpha = \frac{N}{N^2 - S^2} \text{ and } \beta = \frac{-S}{N^2 - S^2}$$

The value of S directly relates to a weight W of the known bit sequence as follows:

$$S = 2W - N \qquad (6)$$

By implementing a least-squares method, the values of x and y of the vector v can be estimated. The estimates of the modulation index h and the frequency offset f may be directly derived from the estimates of x and y respectively. The estimates of the values of x and y of the vector v can be obtained by applying two linear operations on the observation vector $\phi$ and a post-processing step that depends on the weight of the training sequence. As such, equation (4) remains true for v as follows:

$$v = \begin{bmatrix} \alpha & \beta \\ \beta & \alpha \end{bmatrix} \begin{bmatrix} q_1 \\ q_2 \end{bmatrix}, \text{ with } q = B^T \phi = \begin{bmatrix} \sum_{k=1}^N b_k \phi_k \\ \sum_{k=1}^N \phi_k \end{bmatrix} \qquad (7)$$

wherein $q_1$ and $q_2$ are the elements of the vector q, with $q_1$ representing the output of the first filter (correlation operation) and $q_2$ representing the output of the second low-pass comb filter. FIG. 1 illustrates a block diagram of an estimator 100 in accordance with principles of the present invention. The estimator 100 of FIG. 1 is based on the data matrix shown in equation (3). The estimator 100 implements the operations of equation (7) and, as mentioned above, assumes white noise and no ISI. A received signal $\phi_k$ (the signal received, mixed down to base-band, and differentially demodulated) is passed through a first finite-impulse-response (FIR) filter 102 to yield $q_1$. The coefficients for the correlation filter 102 are +1 or −1. The received signal $\phi_k$ is also passed through a second FIR filter 104 to yield $q_2$.

As described above, the training sequence, which is a data sequence known at both the receiver and the transmitter, can be used to derive α and β. The calculated α is output to a first multiplier 106A and a fourth multiplier 106D. The derived β is output to a second multiplier 106B and a third multiplier 106C. $q_1$, which is output by the first FIR filter 102, is multiplied, at the first multiplier 106A, with the derived α. $q_1$ is also multiplied, at the second multiplier 106B, with the derived β.

$q_2$, which is output by the second FIR filter 104, is multiplied with the derived β at the third multiplier 106C. $q_2$, which is output by the second FIR filter 104, is also multiplied with the derived α at the fourth multiplier 106D.

The result output by the first multiplier 106A and the result output by the third multiplier 106C are added at a first adder 108A. The result output by the second multiplier 106B and the result output by the fourth multiplier 106D are added at a second adder 108B. The result output by the first adder 108A is x from equation (2). From equation (2), x can be scaled to yield an estimate of the modulation index h. As shown in equation (2), by multiplying x with $1/\pi$, the modulation index h is produced. Therefore, at multiplier 110A, x is multiplied with $1/\pi$, thereby yielding an estimate of the modulation index h. As is also evident from equation (2), the output of the second adder 108B, y can be multiplied by $1/(2\pi T_{sym})$ at multiplier 110B to produce an estimate of the frequency offset f.

Because of the data model used, the simple estimator 100 might yield biased results. For example, a non-zero mean noise term or correlation between the noise and the desired signal might cause the simple estimator 100 to produce unsatisfactory results. The bias in the estimate of the modulation index typically depends on one or more of the frequency offset, the modulation index, and the value of a signal-to-noise ratio $E_b/N_o$. Most typically, no significant bias is present for the estimate of the frequency offset.

In the event that $E_b/N_o$ is difficult to estimate, the bias in the modulation-index estimate can be compensated for at a particular value of $E_b/N_o$. For example, the value of $E_b/N_o$ at which the receiver operates at a bit-error rate (BER) of $10^{-3}$ can be selected. In addition, because the bias in the modulation-index estimate depends on the modulation index itself, the bias can be compensated for at a typical modulation index value, such as, for example, 0.32.

A post-processing step in accordance with principles of the present invention takes into account the fact that the bias in the estimate of the modulation index h depends approximately quadratically on the estimated frequency offset f in order to compensate for the bias in the modulation index estimate. For a bias-compensated modulation index $h_{comp}$, the following quadratic equation holds:

$$h_{comp} = h + C_o + C_2 y^2 \quad (8)$$

The coefficients $c_0$ and $c_2$ are chosen via a curve-fitting process in order to minimize the bias. The bias in the modulation-index estimate and the frequency-offset estimate can be derived by simulation. From the simulation results, adequate bias-reduction processes could be derived via curve fitting.

Figure 2:
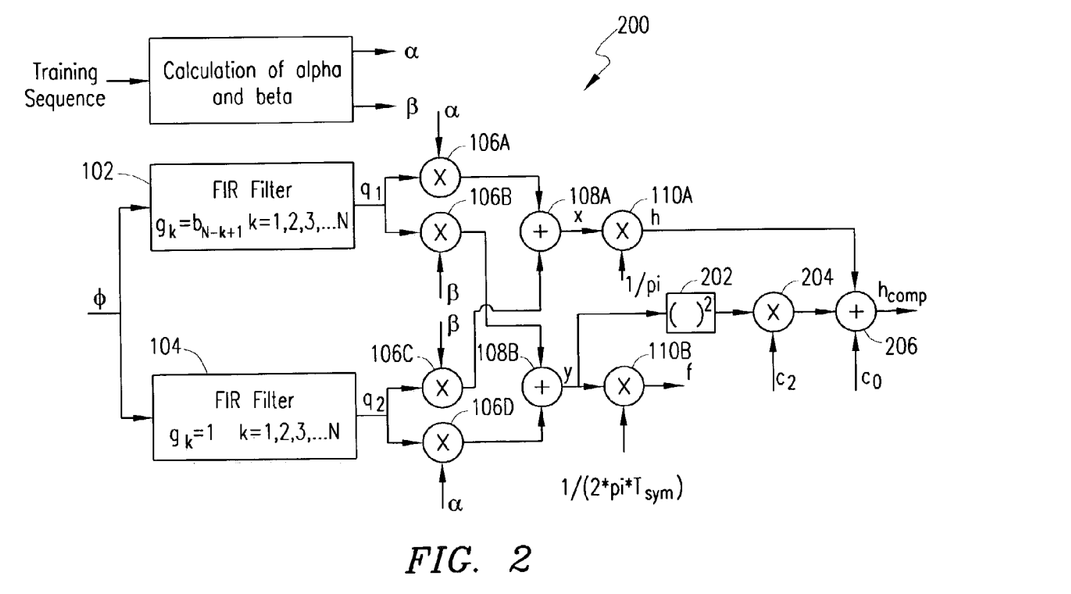
FIG. 2 is a block diagram of the estimator of FIG. 1, including a bias removal component in accordance with principles of the present invention.

FIG. 2 illustrates the estimator of FIG. 1 with additional post-processing to remove bias from the estimate of the modulation index h. The estimator 200 of FIG. 2 is similar to the estimator 100 of FIG. 1, except for the implementation of additional components used to introduce the coefficients $c_0$ and $c_2$. As noted above, the coefficients $c_0$ and $c_2$ are used to remove bias from the estimate of the modulation index h.

As indicated in equation (8), y, which is output by the second adder 108B, is squared by a squaring block 202. An output of the squaring block 202 is multiplied with the value of $c_2$ at a multiplier 204. An output of the multiplier 204 is added, at an adder 206, to $c_0$ and to the estimate of the modulation index h. As noted above, the estimate of the modulation index h is output by the multiplier 110A. The adder 206 outputs the bias-compensated modulation index $h_{comp}$.

The simple estimators 100 and 200 represent relatively computationally-efficient implementations; however, simplification of the data model implemented by the estimators 100 and 200 might not always produce optimal results. Therefore, an estimator based on a more-complex data model than that used in the estimators 100 and 200 can be utilized in another embodiment of the present invention.

Figure 3:
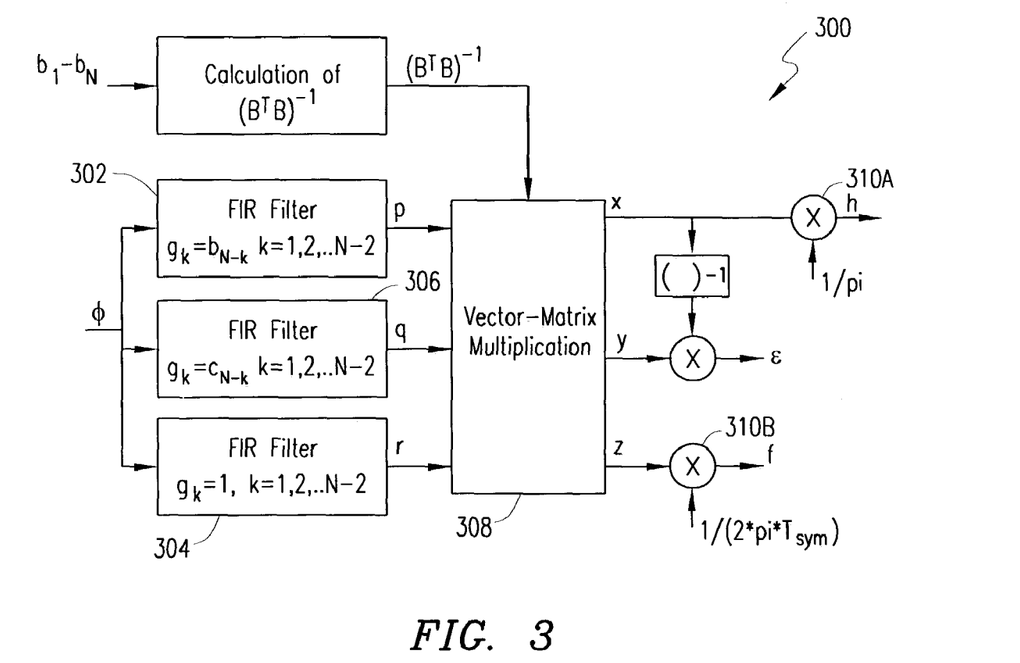
FIG. 3 is a block diagram that schematically illustrates another estimator in accordance with principles of the present invention.

FIG. 3 is a block diagram that schematically illustrates a more-complex estimator 300 in accordance with principles of the present invention. The more-complex estimator assumes white noise in a manner similar to that of estimators 100 and 200. However, the more-complex estimator 300 assumes that ISI is present in the signal and further that the parameter $\epsilon$ (see data model from equation (9) shown below) is unknown.

In the estimator 300, instead of processing the input signal as modeled by equation (3) and implemented in the estimators 100 and 200, the model on which the estimator 300 is based is a more complicated model, namely equation (12) shown below. To limit the complexity of the estimator 300, a relatively simple ISI model has been assumed. However, other ISI models can be used without departing from principles of the present invention.

In the estimator 300, a linear relationship between a differential output phase $\theta_k$ of a transmitter and the input phase $\phi_k$ of the estimator is assumed. The linear relationship of the differential output phase $\theta_k$ and the input phase $\phi_k$ can be modeled as follows:

$$\phi_k = \epsilon \theta_{k-1} + (1-2\epsilon)\theta_k + \epsilon \theta_{k+1} \quad (9)$$

Equation (9) shows the relationship between the input phase $\phi_k$ and the output phase $\theta_k$ and allows for ISI by the parameter $\epsilon$. If no ISI is present, then the parameter $\epsilon$ has a value of zero.

The differential output phase $\theta_k$ can be represented by the following equation:

$$\theta_k = \phi_k - \phi_{k-1} = b_k h \pi \quad (10)$$

wherein $\phi_k$ is the phase of a transmitted symbol $a_k$. Combining equations (9) and (10) and adding the impact of the frequency offset f and the distortion term $n_k$ yields:

$$\phi_k = b_k h \pi + (b_{k-1} - 2b_k + b_{k+1})\epsilon h \pi + 2\pi \theta T_{sym} + n_k$$

$$\phi_k = b_k x + c_k y + z + n_k$$

$$\text{with } c_k = (b_{k-1} - 2b_k + b_{k+1}) \quad (11)$$

Equation (11) shows that the ISI exhibits a relationship with the foregoing bit and the following bit. However, in more severe ISI cases, the ISI may exhibit a relationship with the previous two bits and the following two bits. If the distortion term $n_k$ is omitted, equation (11) can be written in matrix notation as follows:

$$\phi = Bv \text{ in which } \phi = \begin{bmatrix} \phi_2 \\ \phi_3 \\ \phi_4 \\ \vdots \\ \phi_{N-1} \end{bmatrix}, \quad (12)$$

$$v = \begin{bmatrix} x \\ y \\ z \end{bmatrix} \text{ and } B = \begin{bmatrix} b_2 & c_2 & 1 \\ b_3 & c_3 & 1 \\ b_4 & c_4 & 1 \\ \vdots & \vdots & \vdots \\ b_{N-1} & c_{N-1} & 1 \end{bmatrix}$$

When the ISI is not neglected, as mentioned above with respect to equation (11), the foregoing bit and the following bit are required, and therefore the index of equation (12) begins with $b_2$ and ends with $b_{N-1}$.

If the N-2 transmitted bits $\{b_2 \ldots b_{N-1}\}$ are known, equation (12) can be solved by multiplying the observation vector $\phi$ with the pseudo-inverse of B, such that $v = (B^T B)^{-1} B^T \phi$, as shown in equation (4) above.

Referring again to FIG. 3, the estimator 300, which is described mathematically in equations (4), (11), and (12), requires, in addition to the filtering and correlation shown in the estimator 200, another filter, graphically represented as a middle filter 306. The filtering and correlation of filters 302 and 304 operate in a manner similar to filters 102 and 104 of FIG. 2. The middle filter 306 has N−2 coefficients $c_k$. For the coefficients $c_k$, the following holds: $c_k \in \{0, \pm 2, \pm 4\}$.

Variables x and z are manipulated by multipliers 310A and 310B in a manner similar to that shown for x and y in FIG. 2 to yield the, modulation index h and the frequency offset f. In cases where the ISI is dominated by the transmitter characteristics and the receiver filter chain, the value of the parameter $\epsilon$ from equation (9) may be assumed to be known. The parameter $\epsilon$ is deduced given the overall filter chain in the transmitter and receive parts of the transceiver. Therefore, the estimator 300 may be simplified by assuming, in addition to white noise and ISI, that the parameter $\epsilon$ is known. Due to this fact, the estimator 300 can be simplified and the number of filters utilized reduced as shown in FIGS. 3A and 3B.

Figure 3A:
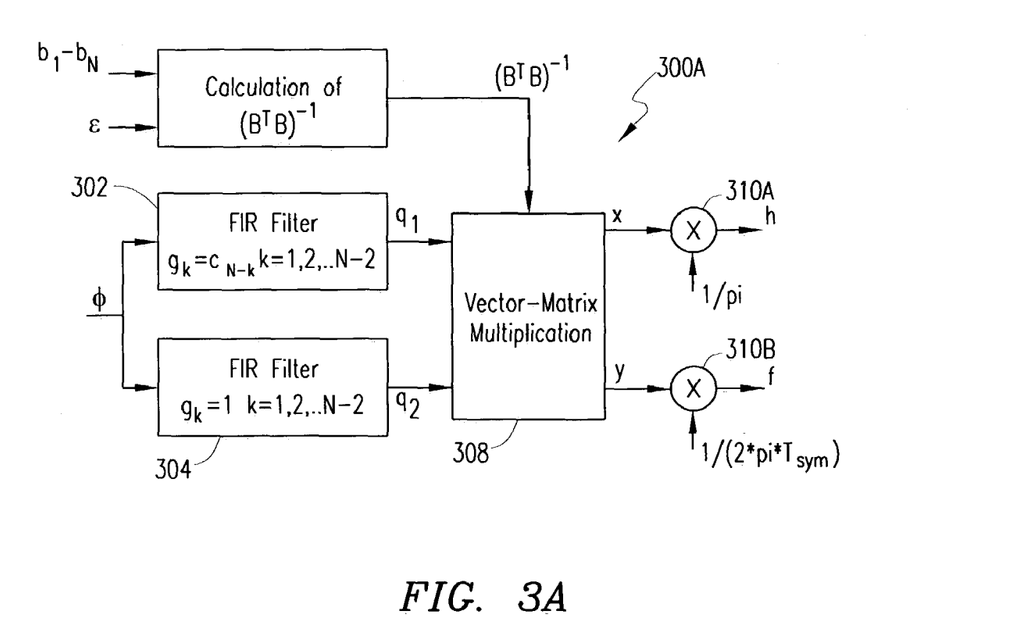
FIG. 3A is a block diagram that schematically illustrates an estimator in accordance with principles of the present invention.
Figure 3B:
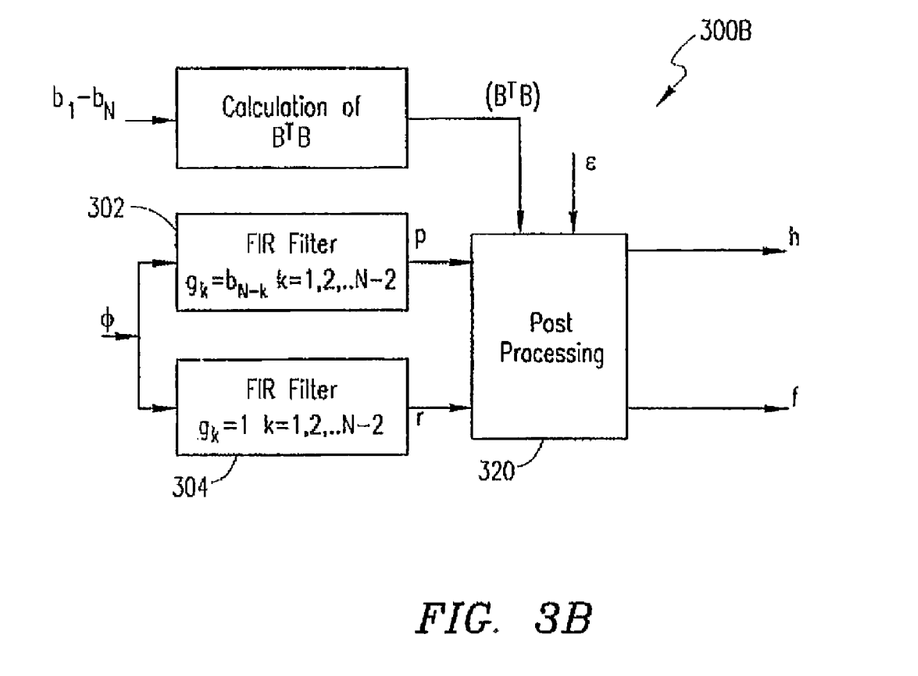
FIG. 3B is a block diagram that schematically illustrates an estimator in accordance with principles of the present invention.

In a first simplified implementation, shown in FIG. 3A, the estimator 300A includes a correlator filter that is slightly more complex because the filter coefficients are no longer +1 or −1 as in the simple estimators 100, 200, and 300. For the first simplified implementation of the estimator 300A, equation (10) is substituted into equation (9), and equation (11) may be rewritten as follows:

$$\phi_k = (\epsilon b_{k-1} + (1-2\epsilon)b_k + \epsilon b_{k+1})h\pi + 2\pi f T_{sym} + n_k$$

$$\phi_k = d_k x + y + n_k$$

with $d_k = (\epsilon b_{k-1} + (1-2\epsilon)b_k + \epsilon b_{k+1})$, $x = h\pi$ and $y = 2\pi f T_{sym}$ \hfill (13)

In the implementation shown in equation (13), the value of the parameter $\epsilon$ is assumed to be known. By omitting the distortion term $n_k$, equation (13) can be rewritten in matrix form as follows:

$$\phi = Bv \text{ in which } \phi = \begin{bmatrix} \phi_2 \\ \phi_3 \\ \phi_4 \\ \vdots \\ \phi_{N-1} \end{bmatrix}, v = \begin{bmatrix} x \\ y \end{bmatrix} \text{ and } B = \begin{bmatrix} d_2 & 1 \\ d_3 & 1 \\ d_4 & 1 \\ \vdots & \vdots \\ d_{N-1} & 1 \end{bmatrix} \quad (14)$$

The implementation of the estimator 300A derived from equation (14) requires two filters: 1) a low-pass filter (304) similar to that in the estimators 100 and 200; and 2) a correlation filter (302) that is matched to the channel (i.e., a matched correlator). Therefore, the N−2 filter coefficients $d_k$ are no longer +1 or −1 but take values of the set $\{\pm 1, \pm(1-2\epsilon), \pm(1-4\epsilon)\}$. As such, the correlation filter is more complex than that of the estimators 100, 200, and 300. The modulation index h and the frequency offset f are calculated in a manner similar to that of FIG. 3. The vector-matrix multiplier 308 outputs variables x and y, which are in turn manipulated by multipliers 310A and 310B to form the estimates of the modulation index h and frequency offset f.

The first implementation of the estimator 300A requires the matched correlator. The matched correlator has increased computational complexity; therefore, a second implementation of the estimator 300 with reduced computation complexity, is described below.

Referring now to FIG. 3B, the second implementation of the estimator of FIG. 3 is illustrated. The second implementation is not as complex as the first implementation; however, the second implementation is more complex than the estimators 100 or 200. In a manner comparable to that of the estimator 200, the second implementation includes a post-processing step that needs to be executed only once.

The description of the estimator 300 of FIG. 3 from equation (12) and (3) produces the following equation:

$$v = (B^T B)^{-1} B^T \phi = (B^T B)^{-1} w \text{ with } w = \begin{bmatrix} p \\ q \\ r \end{bmatrix} \quad (15)$$

p, q, and r are the outputs of the three filters 302, 306, and 304 as shown in the estimator 300. If the value of $\epsilon$ is known, then q, which is the output from the middle filter 306, is not required. As shown in FIG. 3B, the middle filter 306 has been eliminated. With $P_{ij}$ representing the element of the matrix $B^T B$ on row i and column j and because $B^T B$ is symmetric, the following equation results:

$$\begin{bmatrix} p \\ q \\ r \end{bmatrix} = \begin{bmatrix} P_{11} & P_{12} & P_{13} \\ P_{12} & P_{22} & P_{23} \\ P_{13} & P_{23} & P_{33} \end{bmatrix} \begin{bmatrix} x \\ y \\ z \end{bmatrix} = \begin{bmatrix} P_{11} & P_{12} & P_{13} \\ P_{12} & P_{22} & P_{23} \\ P_{13} & P_{23} & P_{33} \end{bmatrix} \begin{bmatrix} h\pi \\ \epsilon h\pi \\ 2\pi f T_{syn} \end{bmatrix} \quad (16)$$

In accordance with equation (16), the following equations prove true:

$$h\pi = \frac{P_{33} p - P_{13} r}{(P_{11} P_{33} - P_{13}^2) - (P_{13} P_{23} - P_{12} P_{33})\epsilon} \text{ and} \quad (17)$$

$$2\pi f T_{sym} = \frac{-P_{13} p + P_{11} r + (P_{12} P_{13} - P_{11} P_{23})\epsilon h\pi}{P_{11} P_{33} - P_{13}^2} \quad (18)$$

Equations (17) and (18) can be manipulated via a processor 320 to yield the estimate of the modulation index h and the frequency offset estimate f. The second implementation of the estimator 300B provides significant advantages over the estimators 100 and 200 when ISI is present.

A third class of estimators includes noise whitening to further improve the performance of the modulation index h and the frequency offset f estimators. A specific configuration of a noise-whitening estimator is given in FIG. 4 which is a block diagram of a noise whitening estimator. Due to differential demodulation preceding the estimation, the distortion term $n_k$ no longer exhibits typical white noise characteristics. Once the covariance of the matrix of the noise is known, the estimation process can be improved.

Figure 4:
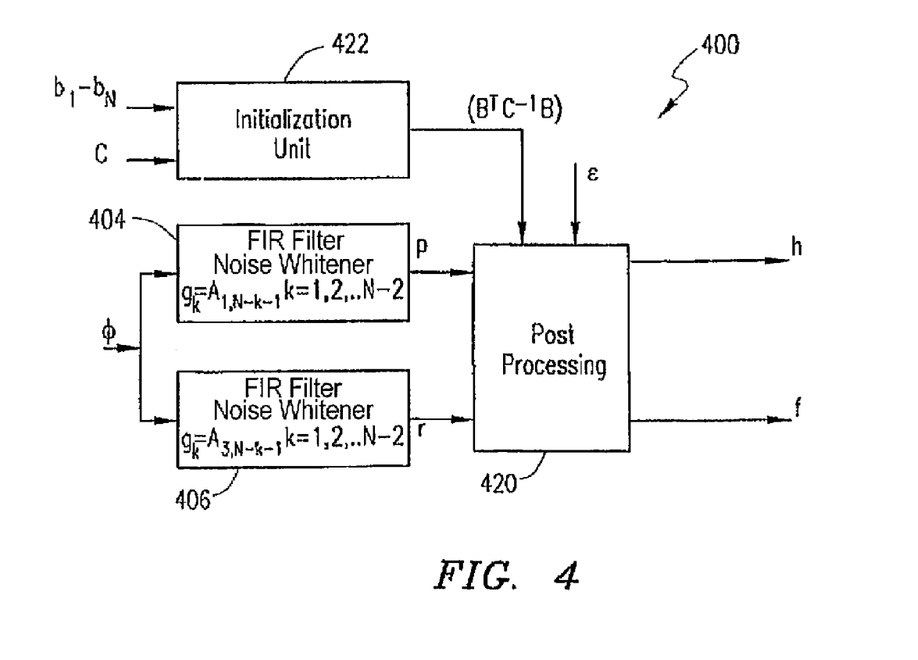
FIG. 4 is a block diagram that schematically illustrates a noise-whitening estimator in accordance with principles of the present invention.

The one-sided autocorrelation function $R_{nn}$ of the noise process $n_k$ can be approximated by the following:

$$R_{nn} = [1 - 0.5] \quad (19)$$

Taking into account the noise covariance matrix C, which may be directly deduced from the one-sided autocorrelation function $R_{nn}$, equation (15) may be replaced by equation (1). The noise whitening is performed by multiplication of the inverse $C^{-1}$ of the noise covariance matrix C. The matrix multiplication of $B^T C^{-1}$ with the observation vector $\phi$ can be implemented in two ways. In a first option, which is used in the estimator of FIG. 4, this operation is implemented by applying n (n being equal to the number of columns of matrix B) filters in parallel (multiplying with $B^T$). In a second option, the operation above is instead performed by two subsequent filter operations, where the first filter operates on the observation vector $\phi$ to whiten the noise present in that vector, i.e. by multiplication of $C^{-1}$. Then the output of this filter is fed to the n filters in parallel (n being equal to the number of columns in matrix B), i.e. multiplication by $B^T$. Both options are functionally the same. In the second option, the whitening of the noise is performed explicitly, while in the first option, the noise whitening is implicitly performed. The estimator described by equation (1) does not restrict the values of the filter coefficients to +1 or −1, thereby increasing complexity over both the estimators 100, 200, and 300. The estimator described by equation (1) is an improved noise-whitening estimator that outperforms the estimators 100, 200, and 300 at the cost of increased complexity.

To reduce complexity of the estimator described by equation (1), a first option is to quantize the inverse of the noise covariance matrix C. Although the complexity might be reduced, the quantization introduces a performance loss in the estimator. A second option is to adapt the structure of the inverse of the noise covariance matrix C. A finite-impulse-response (FIR) filter may be utilized to whiten the noise. Due to the differential demodulated estimator input signal the noise has a high-pass characteristic. Approximated whitening can be achieved by passing the signal through a low-pass filter. One attractive solution would be to use a K-tap comb filter. K may be chosen such that a good balance is obtained between performance loss (compared to ideal whitening) and complexity reduction. A third option would be to implement the approximated whitening operation by means of a low-pass infinite impulse response (IIR) filter.

Any of the three options discussed above can be utilized to reduce the complexity of the noise whitening filter. The best option should be chosen according to applicable system characteristics.

The principles of noise whitening may be applied to any of the above-mentioned estimators. Depending on the data model, matrix B, that has been assumed, the estimators 100, 200, 300, 300A, and 300B may include colored-noise compensation. For example, by substituting the data model from equation (3) into equation (1), an estimator similar to that of estimator 100 is obtained, except that the estimator is now colored noise compensated. Substituting the data model from equation (11) into equation (1) yields a noise-whitened estimator similar to that of estimator 300. All of the estimators 100, 200, 300, 300A, and 300B may be altered, by changing the noise model used, to yield colored-noise-compensated estimators.

Referring again to FIG. 4, the incoming signal $\phi$ is passed to each of a first FIR filter 404 and a second FIR filter 406 in order to be low-pass filtered. The first and second FIR filters 404, 406 operate in a manner similar to those of FIG. 3B, except that $A=B^T C^{-1}$. The FIR filters 404, 406 implicitly whiten the noise based on the values of the matrix A. An output p of the first FIR filter 404 and an output r of the second FIR filter 406 are similar to the p and r values of the estimator 300B, except for the addition of the noise whitening. The outputs p and r are utilized in further calculations made in a post processor 420.

An initialization unit 422 of the estimator 400 receives the training sequence $\{b_1 \ldots b_n\}$. Depending on the assumed data model, parameter $\epsilon$ may also be required (see equations (13) and (14)). Once the matrix B, which represents the data model, is calculated, then matrix $B^T C^{-1} B$ is calculated. The matrix $B^T C^{-1} B$, along with the outputs p and r, is passed to the post processor 420 as an initialized training sequence and estimates the modulation index h and the frequency offset f in accordance with the above equations.

While exemplary embodiments of the present invention have been described, it should be recognized that the invention can be varied in many ways without departing therefrom. Although the present invention has been described primarily as being used in, for example, an ad hoc wireless system operating according to BLUETOOTH, embodiments of the invention can also be used in other systems that utilize CPM. Because the invention can be varied in numerous ways, it should be understood that the invention should be limited only insofar as is required by the scope of the following claims.

What is claimed is:

1. An estimator for estimating a modulation index and frequency offset of a received continuous-phase-modulated (CPM) signal, the estimator comprising:
    at least two filters for filtering the received CPM signal;
    a calculator for calculating an $\alpha$ value and a $\beta$ value;
    a processor for receiving a signal output by each of the at least two filters, the $\alpha$ value, and the $\beta$ value; and
    wherein the processor is adapted to calculate estimates of the modulation index and frequency offset from the signals received by the processor and the received $\alpha$ value and $\beta$ value.

2. The estimator of claim 1, further comprising a post-processor for removing bias from the estimation of the modulation index.

3. The estimator of claim 2, wherein the postprocessor receives information relating to the frequency offset and manipulates the modulation index to form a compensated modulation index.

4. The estimator of claim 1, wherein the at least two filters are finite impulse response (FIR) filters.

5. The estimator of claim 1, wherein the estimator is implemented in a BLUETOOTH device.

6. A method of estimating a modulation index and frequency offset of a received continuous-phase-modulated (CPM) signal, the method comprising:
    filtering the received CPM signal via at least two filters;
    calculating an $\alpha$ value and a $\beta$ value;
    receiving a signal output by each of the at least two filters, the $\alpha$ value, and the $\beta$ value; and
    calculating estimates of the modulation index and frequency offset from the filtered received signals and the received $\alpha$ value and $\beta$ value.

7. The method of claim 6, further comprising removing bias from the estimation of the modulation index.

8. The method of claim 7, wherein the step of removing bias comprises receiving information relating to the frequency offset and manipulating the modulation index to form a compensated modulation index.

9. The method of claim 6, wherein the steps are performed in the order listed.

10. The method of claim 6, wherein the at least two filters are finite impulse response (FIR) filters.

11. The method of claim 6, wherein the method is implemented in a BLUETOOTH device.

12. An estimator for estimating a modulation index and frequency offset of a received continuous-phase-modulated (CPM) signal, the estimator comprising:
    a noise whitener for whitening noise of the received CPM signal;

at least two filters for filtering the noise-whitened CPM signal;
an initializer for processing a training sequence;
a processor for receiving a signal output by each of the at least two filters and the processed training sequence; and
wherein the processor is adapted to calculate estimates of the modulation index and frequency offset from the signals received by the processor and the processed training sequence.

13. The estimator of claim 12, wherein the at least two filters are finite impulse response (FIR) filters.

14. The estimator of claim 12, wherein the estimator is implemented in a BLUETOOTH device.

15. The estimator of claim 12, wherein the noise whitener whitens the noise prior to the at least two filters.

16. The estimator of claim 12, wherein at least one of the at least two filters comprises the noise whitener.

17. A method of estimating a modulation index and frequency offset of a received continuous-phase-modulated (CPM) signal, the method comprising:
whitening noise of the received CPM signal;
filtering the noise-whitened CPM signal via at least two filters;
processing a training sequence;
receiving a signal output by each of the at least two filters and the processed training sequence; and
calculating estimates of the modulation index and frequency offset from the filtered received signals and the processed training sequence.

18. The method of claim 17, wherein the steps are performed in the order listed.

19. The method of claim 17, wherein the at least two filters are finite impulse response (FIR) filters.

20. The method of claim 17, wherein the method is implemented in a BLUETOOTH device.

21. The method of claim 17, wherein the step of whitening is performed before the step of filtering.

22. The method of claim 17, wherein the step of whitening is performed by at least one of the at least two filters.

23. An estimator for estimating a modulation index and frequency offset of a received continuous-phase-modulated (CPM) signal, the estimator comprising:
at least two filters for filtering the received CPM signal;
a noise whitener for whitening noise of a signal output by the at least two filters;
an initializer for processing a training sequence;
a processor for receiving signals output by the noise whitener and the processed training sequence; and
wherein the processor is adapted to calculate an estimate of the modulation index and the frequency offset from the signals output by the noise whitener and the processed training sequence.

24. An estimator for estimating a modulation index and frequency offset of a a received continuous-phase-modulated (CPM) signal, the estimator comprising:
a receiver for receiving the CPM signal; and
a processor for estimating the modulation index and frequency offset according to the following equation:

$$v=(B^T C^{-1} B)^{-1} B^T C^{-1} \phi$$

wherein $v$ represents a vector;
wherein the vector includes elements representing scaled versions of estimates of the modulation index and the frequency offset;
wherein C represents a noise covariance matrix;
wherein B represents a data model matrix; and
wherein $\phi$ is an observation vector that represents a phase of the CPM signal.

25. The estimator of claim 24, wherein the data model matrix is modeled by the following equation:

$$B = \begin{bmatrix} b_1 & 1 \\ b_2 & 1 \\ b_3 & 1 \\ \vdots & \vdots \\ b_N & 1 \end{bmatrix}$$

wherein $b_1, b_2, b_3, \ldots b_N$, represent bits of a training sequence.

26. The estimator of claim 24, wherein the data model matrix is modeled by the following equation:

$$B = \begin{bmatrix} b_2 & c_2 & 1 \\ b_3 & c_3 & 1 \\ b_4 & c_4 & 1 \\ \ldots & \ldots & \ldots \\ \ldots & \ldots & \ldots \\ \ldots & \ldots & \ldots \\ b_{N-1} & c_{N-1} & 1 \end{bmatrix}$$

wherein $b_2, b_3, b_4, \ldots b_{N-1}$, represent bits of a training sequence; and
wherein $c_2, c_3, c_4 \ldots C_{N-1}$, represent filter coefficients.

27. The estimator of claim 26, wherein a relationship between the bits of the training sequence and the filter coefficients is defined by the following equation:

$$c_k = (b_{k-1} - 2b_k + b_{k+1}).$$

28. The estimator of claim 24, wherein the data model matrix is modeled by the following equation:

$$B = \begin{bmatrix} d_2 & 1 \\ d_3 & 1 \\ d_4 & 1 \\ \ldots & \ldots \\ \ldots & \ldots \\ \ldots & \ldots \\ d_{N-1} & 1 \end{bmatrix}$$

wherein $d_2, d_3, d_4, \ldots, d_{N-1}$, represent filter coefficients.

29. The estimator of claim 28, wherein a relationship between the bits of the training sequence and the filter coefficients is defined by the following equation:

$$d_k = (\epsilon b_{k-1} + (1-2\epsilon) b_k + \epsilon b_{k+1}),$$

wherein $\epsilon$ is a parameter indicating an amount of Inter-Symbol Interference present.

30. The estimator of claim 24, wherein the estimator is implemented in a BLUETOOTH device.

* * * * *

UNITED STATES PATENT AND TRADEMARK OFFICE
CERTIFICATE OF CORRECTION

PATENT NO. : 7,277,504 B2
APPLICATION NO. : 10/603469
DATED : October 2, 2007
INVENTOR(S) : Smit It is certified that error appears in the above-identified patent and that said Letters Patent is hereby corrected as shown below:

On the Tile Page, item (73), under "Assignee", in Column 1, Line 1, delete "Telefonktiebolaget" and insert -- Telefonaktiebolaget --, therefor.

In Column 3, Line 40, in Equation "(2)", delete " $\phi_k b_k h\pi + 2\pi f T_{sym} + n_k$ "

and insert -- $\phi_k = b_k h\pi + 2\pi f T_{sym} + n_k$ --, therefor.

In Column 5, Line 22, delete "$10_{-3}$" and insert -- $10^{-3}$ --, therefor.

In Column 5, Line 33, in Equation "(8)", delete " $h_{comp} = h + C_o + C_2 y^2$ "

and insert -- $h_{comp} = h + c_o + c_2 y^2$ --, therefor.

In Column 6, Line 32, in Equation "(11)", delete "$2\pi\theta T_{sym} + n_k$" and insert -- $2\pi f T_{sym} + n_k$ --, therefor.

In Column 6, Lines 66-67, delete "$v = (B^T B)^{-}_1 B^T \Phi$" and insert -- $v = (B^T B)^{-1} B^T \Phi$ --, therefor.

In Column 7, Line 30, in Equation "(13)", delete "$n_k$" and insert -- $n_k$ --, therefor.

Signed and Sealed this

Ninth Day of September, 2008

JON W. DUDAS
*Director of the United States Patent and Trademark Office*